Figure 1:
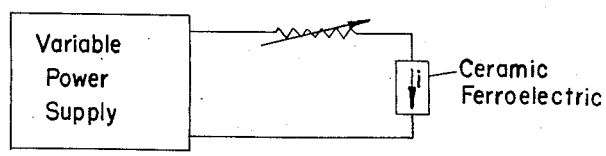

May 5, 1959     R. A. FOTLAND     2,885,521

NON-LINEAR ELECTRIC RESISTOR

Filed Feb. 11, 1957

INVENTOR.
Richard A. Fotland
BY Lawrence I. Field

United States Patent Office 2,885,521
Patented May 5, 1959

2,885,521
NON-LINEAR ELECTRIC RESISTOR

Richard A. Fotland, Cleveland, Ohio, assignor to Horizons Incorporated, Princeton, N.J., a corporation of New Jersey Application February 11, 1957, Serial No. 639,564

6 Claims. (Cl. 201—63)

This invention relates to a non-linear circuit component. More particularly, it results in an extremely compact device which does not conform to Ohm's law when incorporated into an electric circuit. It has been observed that when significant amounts of an oxide of a group V element from the group consisting of $Sb_2O_3$, $As_2O_3$ and $Bi_2O_3$ was added to a ceramic ferroelectric material the resulting compositions, after firing to form a ceramic, exhibited high dielectric constants, high non-linearities, high losses and low dielectric strengths particularly as compared with similarly processed ferroelectric materials to which no such oxide addition had been made, and that such compositions undergo a non-destructive breakdown at a certain field with a limited current flow, and that thereafter the ceramic ferroelectric would function at an almost constant voltage to pass a wide range of electrical currents.

Voltage regulating devices, clippers, limiters, and other standard electrical devices that utilize a highly non-linear component of this type may, therefore, be produced from suitable ferroelectric compositions modified by the addition of a significant amount of group V oxide, in the following manner. A composition is prepared by mixing suitable proportions of the oxides of antimony, arsenic or bismuth with any ferroelectric material. Any of the known ceramic ferroelectric materials may be used, for example, titanates of barium, calcium, strontium or magnesium, or niobates or tantalates of sodium or potassium, or zirconates or stannates or mixtures of two or more of such materials.

The mixture is processed in any well known manner to form a ceramic material. For instance, the ingredients may be prepared as described in Wainer Patent 2,646,359, issued July 21, 1953; that is, the titanate, niobate, or other ferroelectric material may be prepared by calcining suitable quantities of substances which will form the desired ferroelectric and the calcine, after comminution, may be homogeneously mixed with a suitable amount of the group V oxide (Sb, As or Bi) and fired to vitrification temperature under conditions designed to minimize or control the loss of the added oxide as a volatile product. To this end the firing time should be as brief as possible.

Instead of an oxide of arsenic, antimony or bismuth, other compounds of these elements may be used provided they yield the oxide upon heating to temperatures between 1500° F. and 2500° F. in air, or in an oxidizing environment. Thus the carbonates or hydroxides may be substituted for the oxides in the mixture.

After thorough mixing, the mixture is shaped into any desired configuration, preferably with the addition of a temporary binder such as aqueous methyl cellulose (2% by weight), in a manner well understood in the art. The molded body is then fired at a temperature sufficiently high to vitrify the body. Over-all temperatures and duration of firing any specific composition are readily determinable and form no part of the present invention. To prepare a non-linear circuit component from the molded body, suitable electrodes are attached to the body and it is then ready to be incorporated into a forming circuit.

For purposes of illustration I will now describe the preparation of a ceramic composition to be utilized in a voltage regulator, but it will be understood that other applications for devices prepared in the manner described are considered to be within the scope of my invention.

Figure 3:
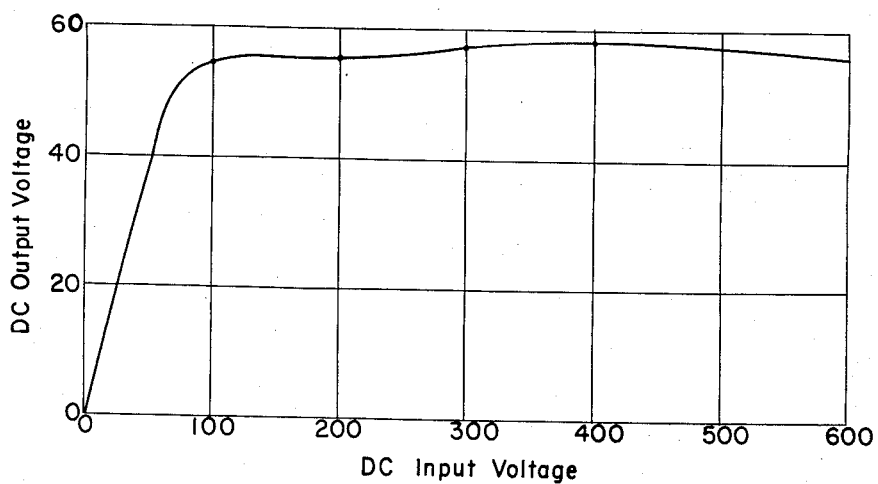

In Figure 1 I have shown the basic circuit for preparation of the fired ceramic ferroelectric. This comprises a suitable resistance interposed between the power supply and the fired body, by means of which the current flowing through the ferroelectric is readily limited. As the voltage across the ferroelectric is increased incrementally, a value is reached at which the ferroelectric experiences a breakdown and passes a current, the magnitude of which is determined by the limiting resistor. It has been established that the current flowing through the device flows along a narrow channel on the surface or through the body itself. Once this channel has been formed by action of the high voltage impressed across the sample, and the potential producing the breakdown has been removed, the body appears to be permanently changed. When voltage is subsequently impressed across the treated ceramic ferroelectric, it is found that at some specific voltage, dependent on the current flow at breakdown, the treated ferroelectric is capable of passing large amounts of current, and hence this voltage is maintained. The characteristics of the resulting ferroelectric body are shown in Figure 3, in which the current is plotted versus voltage for a body composed of 99.5 mol percent of barium titanate and 0.5 mol percent antimony oxide, treated as described in the following specific example.

A mixture was prepared comprising 99.5 mol percent of technical grade $BaTiO_3$ and 0.5 mol percent of technical grade $Sb_2O_3$ by hand mixing the two compounds, in the proportions stated, by means of a glass mortar and pestle. The mixture was then passed twice through a laboratory bench model Mikropulverizer to break up any lumps or agglomerates and to insure a thorough admixture. Approximately 50 grams of the mixture was then packed into a zircon porcelain crucible in which it was calcined in a Globar heated furnace for 2 hours at 2100° F. in an air atmosphere. The resulting calcine was a light cream color and was relatively soft. It was removed from the crucible and crushed to about minus 200 mesh (Tyler standard) in a porcelain mortar, after which it was repacked in the zircon crucible and recalcined for 2 hours at 2100° F., as before. After the second calcination, the composition was again ground to minus 200 mesh (Tyler standard).

The crushed recalcined powder was mixed thoroughly with a binder consisting of a solution of 10% by weight of Carbowax 1540 (a polyethylene glycol), 10% by weight of polyvinyl alcohol (du Pont grade 51A 05, low viscosity type A) and 80% by weight of water. The resulting mixture was granulated through a 28 mesh screen and stored for about 24 hours before pressing.

Discs about 0.015 inch in thickness and having a diameter of 0.235 inch were formed by pressing the binder-calcine mixture at about 10,000 p.s.i. The resulting pieces were fired on a bed of granular fused zirconia at a temperature of 2750° F. for about 30 minutes, which was sufficient to vitrify the pieces. A rapid firing schedule was followed in which the specimens were inserted into a furnace which was already stabilized at 2750°, from which the specimens were withdrawn after they had vitrified.

The same procedure was followed with composition initially consisting respectively of 0.5 mol percent of $As_2O_3$; 0.5 mol percent of $Bi_2O_3$; 1 mol percent of $Sb_2O_3$; $As_2O_3$ and $Bi_2O_3$ and 5 mol percent of the same oxides, balance consisting of $BaTiO_3$ in an amount sufficient to make 100 mol percent.

In another series of experiments the same procedure was followed except that the pressed pieces were first heated to between 1300° F. and 1500° F. for about 2 hours to insure complete removal of the binder before any sintering or vitrification was effected, and the pieces were then rapidly brought to between 2700° F. and 2750° F. for a time sufficient to vitrify the pieces, generally 10 to 30 minutes, as before.

Figure 2:
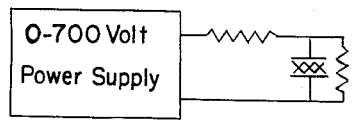

The pieces were activated by connecting them in the circuit shown schematically in Figure 1 and treating them as follows. Each sample prepared with the added group V oxide was subjected to increasingly greater voltages, applied by the power supply until the sample suffered a dielectric breakdown, the current being limited to 20 milliamperes. The sample then showed a volt-ampere curve similar to a standard voltage regulating tube with a zero resistance voltage of about 55 volts. This sample was then used to regulate the output of a power supply, as shown in the circuit of Figure 2. Figure 3 shows the relationship of D.C. output voltage to D.C. input voltage for this power supply.

As seen in Figure 3, over an input voltage range of 100 to 600 volts, the output voltage changed by less than 10% in the region of 55 volts with no load. The output voltage fluctuated rapidly and sporadically over a range of approximately over 1 volt. Upon applying a load of 7,000 ohms the output voltage dropped 6%. In another experiment the current passing through the sample was observed with an oscilloscope at an average current of 20 milliamperes direct current. Random current pulses roughly equalling 0.1 milliampere and 1 to 10 milliseconds in duration were observed.

Similar tests were conducted on the remaining compositions described above, with comparable results. In each instance breakdown occurred whereby the resulting article could be used as a voltage regulator.

The foregoing illustrates the utility of the materials described above as voltage regulating devices. While I have disclosed compositions in which the ceramic ferroelectric material constituting the principal constituent was barium titanate and in which from 0.5 to 5% (mol percent) of a group V oxide constituted the remainder, it will be understood that other known ferroelectric materials having similar properties may be substituted for some or all of the barium titanate and that greater amounts of the group V oxide could be included in the compositions without materially altering the application of the resulting compositions. Amounts from about 0.5 mol percent up to about 20 mol percent of any of the oxides of antimony, arsenic or bismuth, or a combination of them, may be added to the ceramic ferroelectric without materially departing from my invention.

Having now described my invention in accordance with the patent statutes, I claim:

1. A method of passing electric current over a wide range at substantially constant voltage by means of a ferroelectric material which comprises: forming a composition consisting essentially of between 80 mol percent and 99.5 mol percent of said ferroelectric material and the remainder at least one oxide of the group consisting of antimony oxide, arsenic oxide and bismuth oxide; firing the composition; impressing a potential across said fired composition incrementally in increasing amounts until the ferroelectric experiences a dielectric breakdown; removing the impressed potential; and thereafter passing a large range of currents at a substantially constant voltage through said fired composition.

2. A method of passing electric current over a wide range at substantially constant voltage by means of a ferroelectric material which comprises: forming a composition consisting essentially of between 80 mol percent and 99.5 mol percent of a barium titanate ferroelectrical material and the remainder at least one oxide of the group consisting of antimony oxide, arsenic oxide and bismuth oxide; firing the composition; impressing a potential across said fired composition incrementally in increasing amounts until the ferroelectric experiences a dielectric breakdown; removing the impressed potential; and thereafter passing a large range of currents at a substantially constant voltage through said fired composition.

3. A method of passing electric current over a wide range at substantially constant voltage by means of a ferroelectrical material which comprises: forming a composition consisting essentially of about 99.5 mol percent of barium titanate and about 0.5 mol percent of antimony oxide; firing the composition; impressing a potential across said fired ceramic incrementally in increasing amounts until the ferroelectric experiences a dielectric breakdown; removing the impressed potential; and thereafter passing a large range of currents at a substantially constant voltage through said fired composition.

4. An electrically treated ceramic composition consisting essentially of a ceramic consisting essentially of between 80 mol percent and 99.5 mol percent of a ferroelectric material and the remainder at least one oxide of the group consisting of antimony oxide, arsenic oxide and bismuth oxide, which has been subjected to a potential sufficient to cause the ceramic ferroelectric product to experience a dielectric breakdown.

5. A voltage regulator which comprises a member consisting essentially of from about 80 mol percent to about 99.5 mol percent of barium titanate and between about 20 mol percent and 0.5 mol percent of an oxide of the group consisting of antimony oxide, arsenic oxide and bismuth oxide; which has been fired at a sufficiently elevated temperature for a sufficient time to vitrify the composition and which has been conditioned to possess the property of passing a wide range of electric current at substantially constant voltage; by having had a sufficient voltage impressed across it to cause it to experience a dielectric breakdown.

6. The voltage regulator of claim 5 in which the ceramic is formed of about 99.5 mol percent of barium titanate and about 0.5 mol percent of antimony oxide.

References Cited in the file of this patent

UNITED STATES PATENTS 2,469,569    Ohl _____ May 10, 1949

OTHER REFERENCES

Coffeen: "Antimonates as Additives to Barium Titanate Dielectric Bodies," Journal American Ceramic Society, vol. 39, No. 4, April 1956, pages 154–158.